United States Patent [19]

Bartelt et al.

[11] Patent Number: 4,734,866
[45] Date of Patent: Mar. 29, 1988

[54] COMPUTER CONTROLLER FOR AN INDUSTRIAL MULTIAXIS ROBOT

[75] Inventors: Richard Bartelt, Erlangen; Christof Meier, Heroldsbach, both of Fed. Rep. of Germany

[73] Assignee: Siemens Aktiengesellschaft, Munich, Fed. Rep. of Germany

[21] Appl. No.: 742,805

[22] Filed: Jun. 10, 1985

[30] Foreign Application Priority Data

Jul. 5, 1984 [DE] Fed. Rep. of Germany ....... 3424762

[51] Int. Cl.$^4$ .............................................. G05B 19/00
[52] U.S. Cl. .................................... 364/513; 364/174;
364/184; 901/4; 901/15; 901/20
[58] Field of Search ............... 364/513, 174, 170, 184,
364/169; 318/568; 901/3, 4, 15, 20, 2

[56] References Cited

U.S. PATENT DOCUMENTS

| | | | |
|---|---|---|---|
| 3,479,574 | 11/1969 | Kosem | 318/18 |
| 3,909,600 | 9/1975 | Hohn | 235/151 |
| 3,920,972 | 11/1975 | Corwin, Jr. et al. | 235/151 |
| 4,338,672 | 7/1982 | Perzley et al. | 364/513 |
| 4,528,632 | 7/1985 | Nio | 364/513 |
| 4,594,671 | 6/1986 | Sugimoto | 264/513 |

Primary Examiner—Jerry Smith
Assistant Examiner—MacDonald, A.
Attorney, Agent, or Firm—Kenyon & Kenyon

[57] ABSTRACT

An optimum velocity controller having absolute track faithfulness for linear track motions of articulated robots having several axes of motion. If at least one velocity reference value of an axis of motion exceeds an assigned limit, the velocity of the predetermined total motion of the track is reduced. In order to obtain a stable control behavior of the robot, an additional velocity reduction of the track motion is executed for each of the individual axes of motion within predetermined range limits. The boundaries of these range limits are selected according to the respective velocity and/or acceleration of the robot along the track.

4 Claims, 13 Drawing Figures

COMPUTER CONTROLLER FOR AN INDUSTRIAL MULTIAXIS ROBOT

BACKGROUND OF THE INVENTION

The present invention relates to a computer controller for an industrial multiaxis robot, in which the motion of the robot tip given in stationary coordinates is transformed into corresponding reference values for the drives in the individual robot axes.

The tracing of linear tracks with orientation-following of a tool generally requires a six-axis robot. Controllers for such six-axis articulated robots with coordinate transformation are known (see, for instance, U.S. Pat. Nos. 3,909,600 or 3,920,972). In calculating the transformation values, it can happen for certain axis constellations that individual axes would have to assume very large acceleration and velocity values in order to maintain the prescribed track. The theoretical values so obtained can far exceed the permissible limit, be it because of the drives or on the part of mechanical safety. In order to avoid such overloads it would be conceivable, for instance, to design the controller in such a manner that the robot stops in these critical positions. Starting from a standstill so reported, another track would then have to be programmed. Another possibility would be to limit the determined reference values for velocity and acceleration. This, however, would have the result that the prescribed, for instance, straight-line track cannot be followed in many cases.

SUMMARY OF THE INVENTION

It is therefore an object of the present invention to design a controller of the type mentioned above such that faithfulness to the track is preserved and such that, specifically, impermissible velocities or accelerations in the individual robot axes are prevented.

The above and other objects of the present invention are achieved by a computer controller for an industrial multiaxis robot, wherein, if at least one velocity reference value of one axis exceeds its assigned limit, the velocity of the predetermined total motion is reduced until none of the velocity reference values exceeds its assigned limit.

Thus, the velocity of all axes are continuously monitored, for instance, at the interpolation clock rate of the computer of the controller. If one or more axes exceed their set velocity reference value, the overall track velocity is reduced internally by the controller. This reduction can be performed under controlled conditions, and the control characteristic of the controller can be made a function of the respective track velocity.

Depending on the robot geometry, it may also happen that the controller becomes unstable for certain values of an axis relatively close to the robot tip, usually the next to the last axis of rotation. In order to avoid such operating conditions, an additional control of the track velocity is provided which takes the position of this axis into consideration. The utilization and the magnitude of this track velocity reduction can likewise be made dependent on the respective actual track velocity.

BRIEF DESCRIPTION OF THE DRAWINGS

The invention will be described in greater detail in the following detailed descrition with reference to the drawings in which.

DETAILED DESCRIPTION

Figure 1:
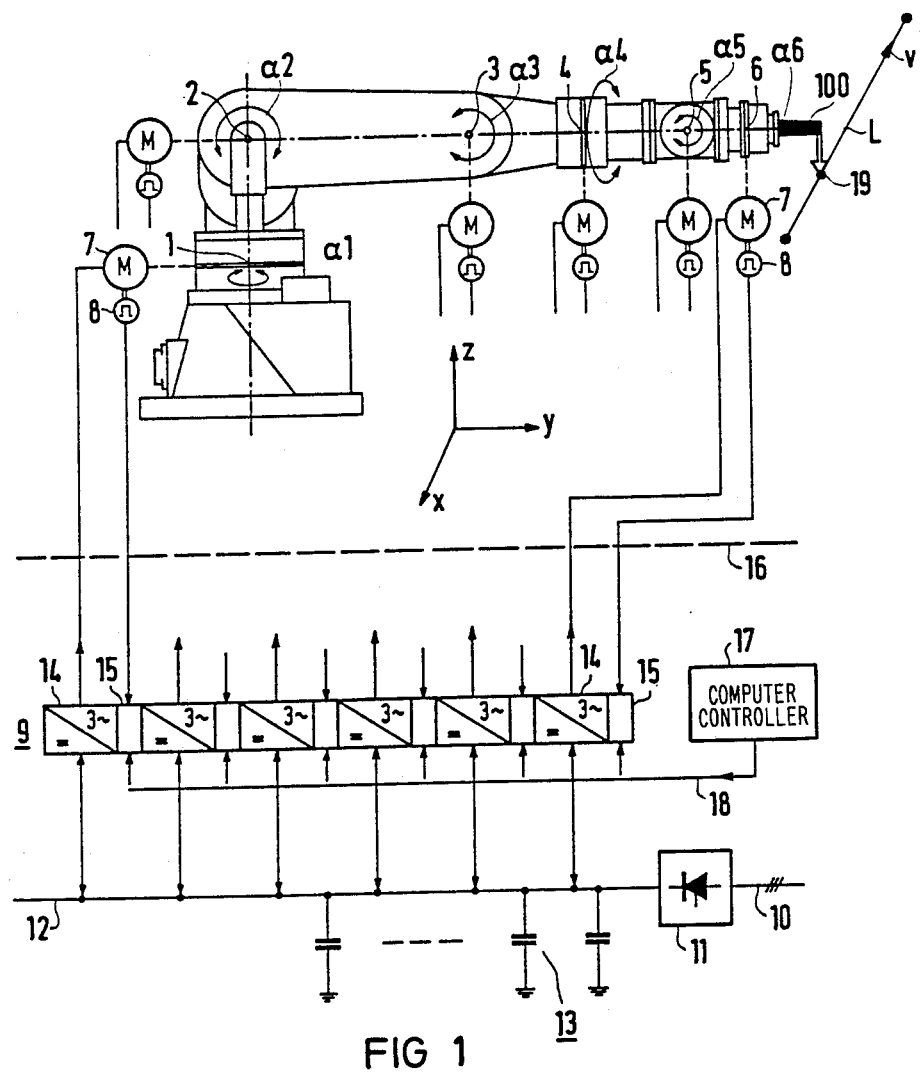
FIG. 1 shows the basic block diagram of a controller for a six-axis industrial robot.

With reference now to the drawings, the articulated robot according to the invention schematically shown in FIG. 1 has six joints 1 to 6 which make rotation about six axes 1 to 6 possible. The three-phase motors 7 serving to drive the individual joints 1 to 6 are integrated together with the corresponding reduction gears and the distance pickup 8 flanged to them into each of the joints 1 to 6. A schematically shown tool 100 is arranged at the end of joint 6.

The system 9 which serves to drive the motors 7 and is arranged fixed in a control cabinet, as indicated by the dashed line 16, comprises a converter 11 connected to a three-phase network 10, an intermediate d-c voltage link 12 with a capacitor battery 13, and individual converters 14 for feeding the motors 7. A control unit 15 is assigned which, as indicated by the arrow 18, obtains its control commands from a computer controller 17. Such a controller is described, for instance, in Siemens-Zeitschrift 1981, pages 285 to 289.

As a rule, the tracks to be followed by the robot tip 19, for instance, the straight line L which is to be travelled with a predetermined velocity V are given by programming with respect to a fixed coordinate system xyz. These given Cartesian coordinate values are transformed by the controller into corresponding rotary motions of the individual axes 1 to 6. Transformations of this kind are described, for instance, in greater detail in the U.S. Patents mentioned above. If, for instance, the tip 19 is to travel on the mentioned track L and if at the same time the orientation of the tool 100 held there is to remain constant in space, it cannot fail that under some conditions, all axes of the robot are driven while a track is being negotiated. As already noted, this can lead under certain unfavorable conditions to the situation that high velocities occur in the individual axes due to the mathematical-kinematic characteristics of the robot. These impermissible velocities are to be avoided by an addition to the known controller, and at the same time adherence to the track is preserved.

Figure 2:
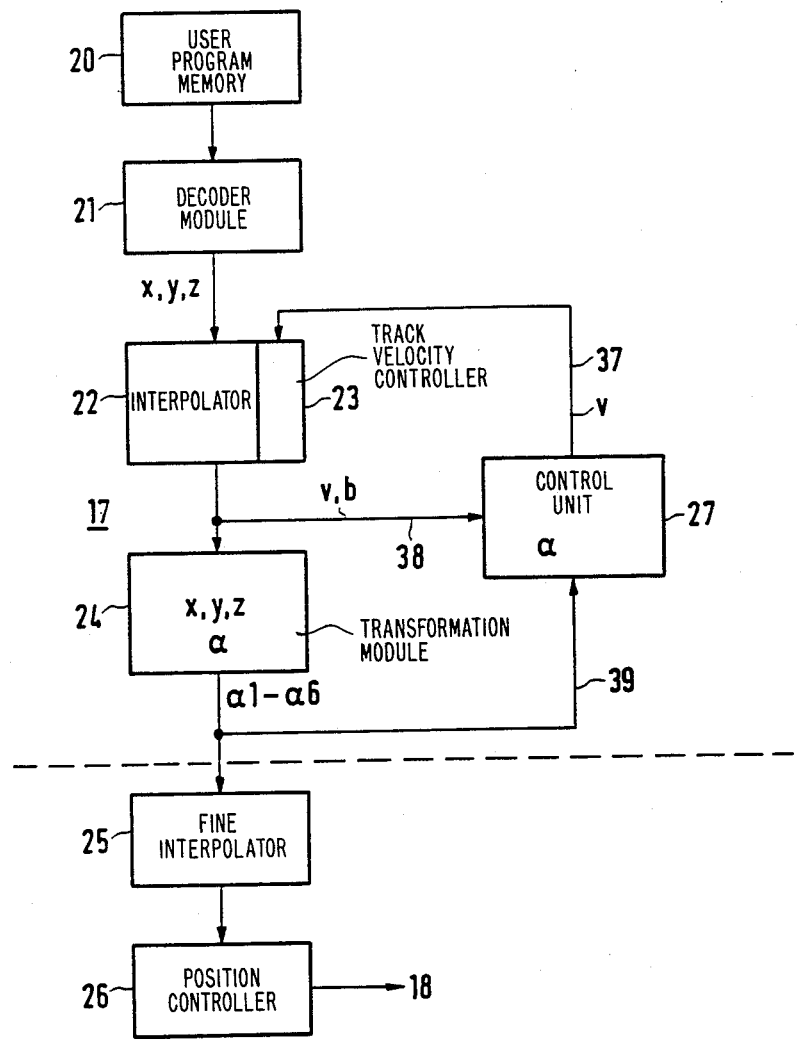
FIG. 2 shows the basic block diagram for the controller according to the invention.

In FIG. 2, the basic design of the controller is shown, the units optionally combined in a computer being shown as individual functional blocks for the sake of simplicity. As shown, the program in a user program memory 20 controlling the predetermined robot motion is decoded in a decoder module 21, and the intermediate points located between predetermined points are calculated, the rate of output of the intermediate points determining the velocity of motion V. The adjustability of this velocity output is indicated by the track velocity control section 23. The values delivered by the interpolator 22 are present in the Cartesian coordinate system x, y, z, which is fixed in space. The values are therefore converted in a transformation module 24 from Cartesian coordinates xyz into corresponding reference values (reference angles) for the axis $\alpha 1$ to $\alpha 6$. These reference values for the axes $\alpha 1$ to $\alpha 6$ given out at a predetermined rate are interpolated again in fine-interpolators 25 and then fed to a position controller 26 which delivers the individual velocity reference value to the control units 15 of the motors 7. A control of this type is known in principle from the above-mentioned Siemens-Zeitschrift.

Additionally, a further control unit 27 is provided for optimally changing the track velocity; this applies primarily to cases in which impermissible velocities would come about in individual axes due to the transformation. In order to avoid this, the reference velocities expected from the present changes of the angles are extrapolated in the individual axes $\alpha 1$ to $\alpha 6$ from the present changes of the angles and it is checked whether the permissible velocity (angular velocity) is exceeded in any one axis. If this is the case, an intervention into the track velocity controller part 23 (override) is made, as indicated by the line 37, and the track velocity V is reduced until it is again lower than the limit.

Due to the kinematic circumstances of the robot hand, there can be ranges of the axis position which result in particularly strong velocity increases in individual axes, and particularly in the next to last axis closest to the robot tip.

Therefore, a given angle-of-rotation range is monitored in the axis $\alpha 5$ and in this range, the velocity is likewise lowered additionally. The setting-in point can be varied here as a function of the predetermined reference velocity V along the track or the associated acceleration.

Figure 3:
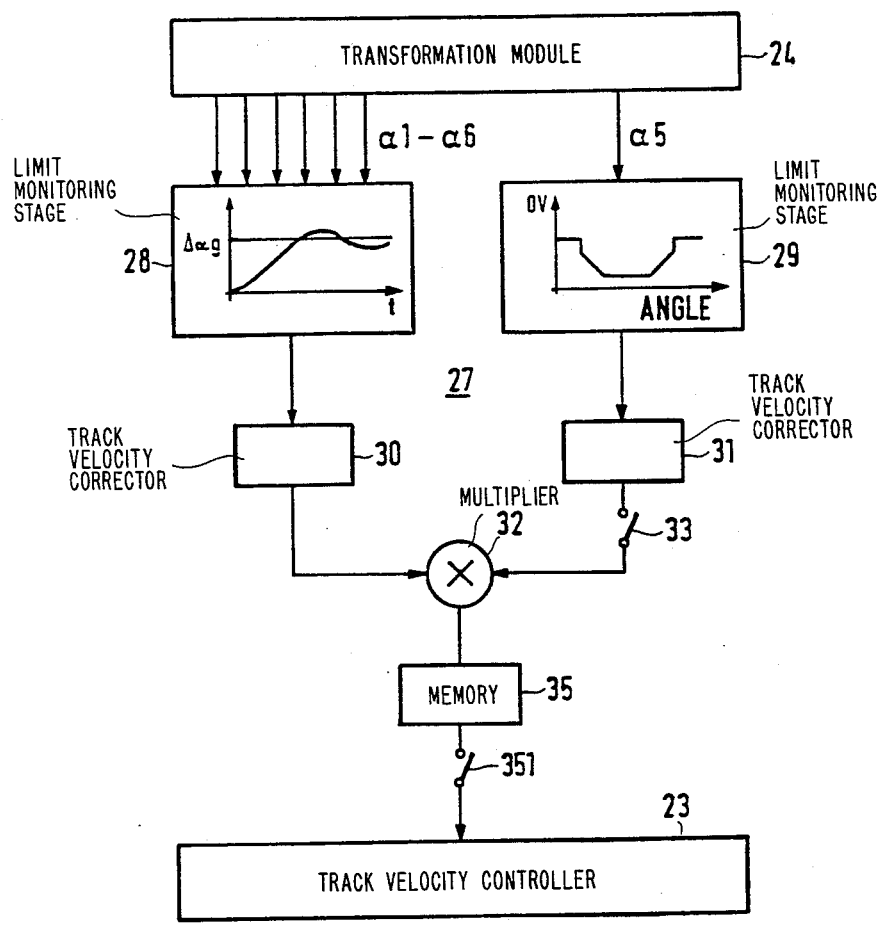
FIG. 3 shows the basic block diagram of the controller section used for optimizing the velocity.

FIG. 3 shows further details of the controller. As can be seen, the reference values coming from the individual axes $\alpha 1$ to $\alpha 6$ are checked in a limit monitoring stage 28 as to whether one of these reference values changes too quickly, i.e., a given velocity is exceeded. If this is the case, the track velocity is lowered by a given amount, as is indicated by the module 30.

At the same time, the axis with the angle of rotation $\alpha 5$ also is monitored as is indicated by the module 29. Within a given angular range which is critical, the track velocity is then likewise lowered in accordance with a predetermined function. In this manner, a further reduction factor is obtained which is indicated by the module 31. These two values, which are represented in the modules 30 and 31, are multiplied with each other in a multiplier 32 and serve as the override value in a memory 35. This is the value by which the predetermined track velocity V is corrected, i.e., reduced in the normal case.

Figure 4:
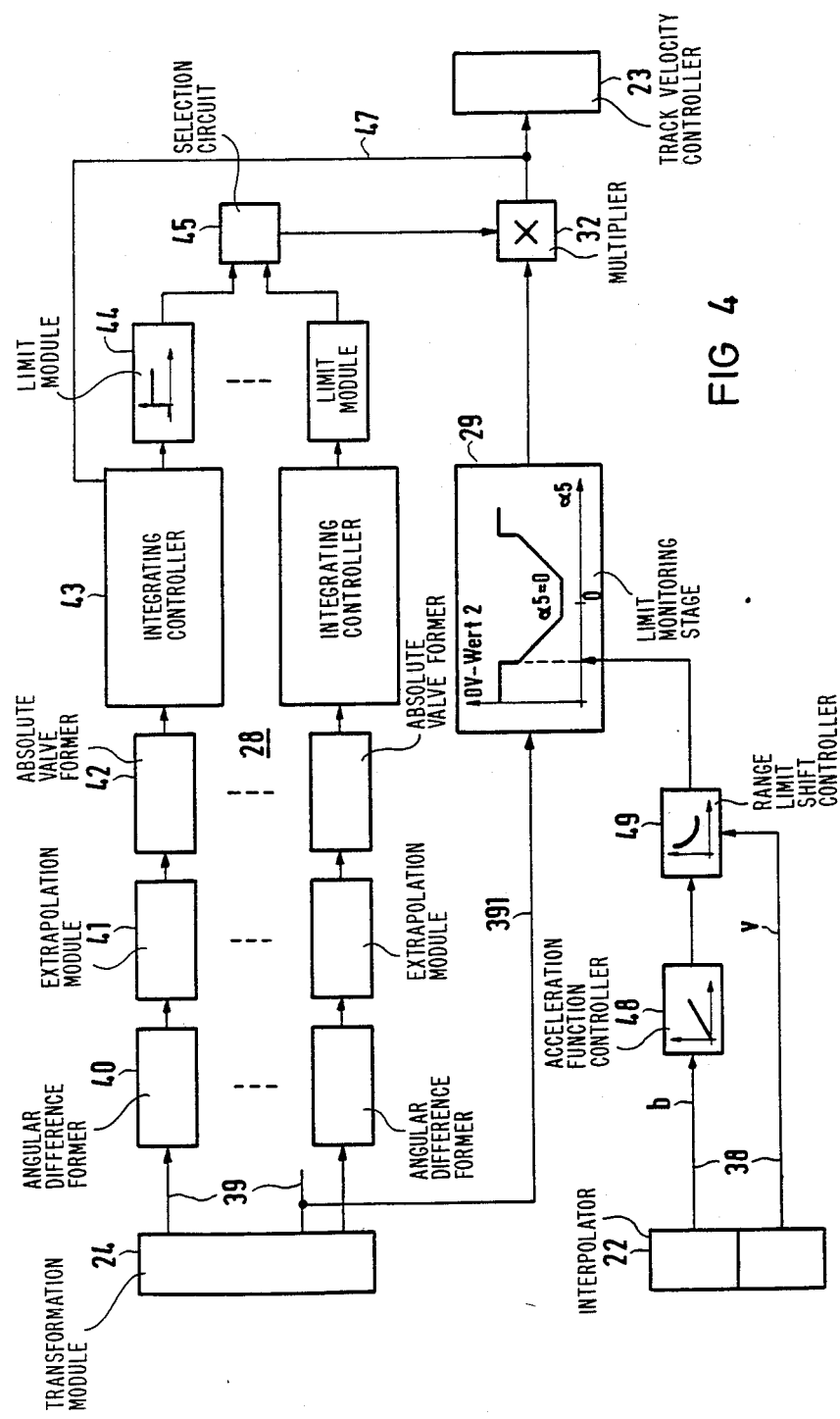
FIG. 4 shows the above-mentioned velocity optimizing section of FIG. 3 in greater detail.

FIG. 4 shows further details of the controller. As shown, the angle values of the axes $\alpha 1$ to $\alpha 6$ on the lines 39 coming from the transformation module 24 are first used to form the angular difference of successive angle values, as indicated by the module 40. Since this difference formation takes place in a predetermined time raster, the values obtained in this manner are also a measure for the velocity of the respective axis. A number of the velocity values so obtained is then used for extrapolating one step ahead, as indicated by the extrapolation module 41. By this value, the absolute value is then formed in a module 42 and is continuously fed to an integrating controller 43. In this integrating controller 43 a value is formed according to the relation $$\frac{\Delta \alpha_G - \Delta \alpha_{k+1}/I}{\Delta \alpha_G}$$

where $\Delta \alpha_G$ is the maximally permissible velocity value and $\Delta \alpha_{k+1}$ the extrapolated velocity of the respective axis. The latter value states to what extent the velocity in the respective axis would move away from the given limit $\alpha \Delta_G$. The control value obtained in this manner is conducted through a limit module 44 and fed to a selection circuit 45. In this manner, the transformed angle of rotation is processed also in the remaining axes $\alpha 2$ to $\alpha 6$. The selection circuit 45 selects the axis in which the limit is exceeded most and, more specifically, in such a manner that the value obtained at the controller output is used via the multiplier module 32 as an override signal for controlling the track velocity V in the module 23. This control is in effect as long as the respectively predetermined limit is exceeded in one of the axes. As indicated by the line 47, the control characteristic I of the controller 43 is further changed as a function of the resulting track velocity V.

Additionally, the angle of rotation in the axis $\alpha 5$ also is evaluated via the line 391 in such a manner that, in addition, the track velocity V is reduced by a certain factor between values of the angle of, for instance, $\pm 20°$ about zero. This factor is linked multiplicatively in the stage 32 with the reduction factor coming from the integrating controller 43. In addition, the values for acceleration b and velocity v coming from the interpolator 22 are used via controllers 48 and 49 to shift the range limits via controller 29, within which the velocity is reduced. Specifically, this is done in a manner such that this range is widened with increasing velocity and decreasing acceleration and vice versa.

Figure 5:
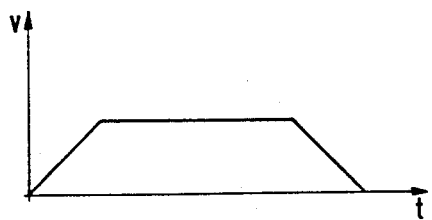
FIGS. 5 to 7 show track and axis velocities of the industrial robot without control of the velocity.
Figure 6:
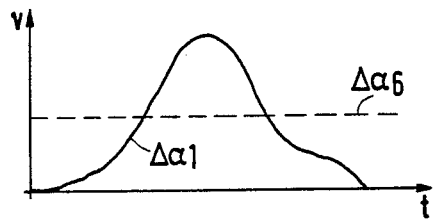
Figure 7:
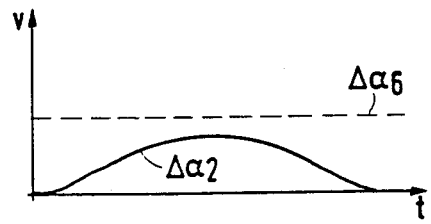

FIG. 5 shows the velocity track curve V, for instance, along the straight line L as a function of the time t without the velocity control described above. As may be seen from FIG. 6, this can lead, for instance, to the situation that the velocity $\Delta \alpha 1$ in the axis $\alpha 1$ would exceed the maximally permissible value $\Delta \alpha_G$ by far, while the resulting velocity change in the axis $\alpha 2$ would remain below the maximally permissible limit $\Delta \alpha_G$ in this axis, a shown in FIG. 7.

Figure 8:
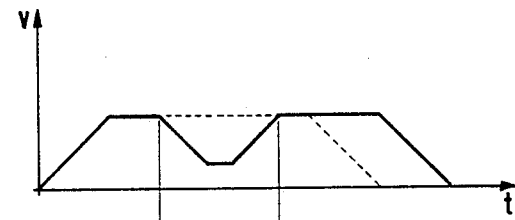
FIGS. 8 to 10 show track and axis velocities of the industrial robot with control of the velocity.
Figure 9:
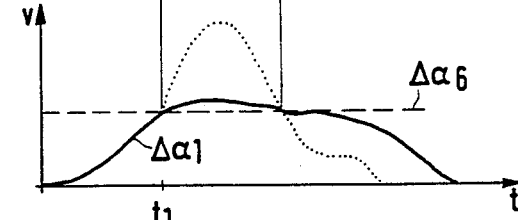
Figure 10:
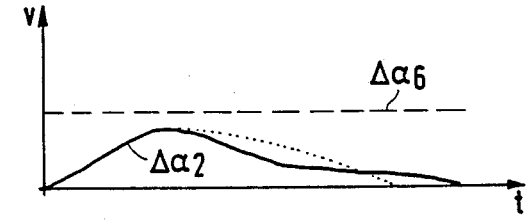

FIGS. 8 to 10 show the conditions if the abovedescribed velocity control is used. Here, the same track velocity curve with the same time behavior as shown in FIG. 5 is assumed in FIG. 8. As can be seen also from the dotted curve in FIG. 9, this would lead in the axis $\alpha 1$ to a condition where the permissible maximum value is exceeded. If therefore it is ascertained by extrapolation that the maximally permissible limit is being exceeded due to the transformation, the track velocity V is reduced at the time $t_1$. Thereby, the solid line for the reference value is obtained in the axis $\alpha 1$ according to FIG. 9. This then also leads to the velocity curve $\Delta \alpha 2$ in the axis $\alpha 2$ shown as a solid line, deviating from the original curve indicated by the dotted line, as shown in FIG. 10.

As shown, the controller provides that the track velocity V is reduced only so long and to such an extent that the velocity is not unduly exceeded in any of the axes $\alpha 1$ to $\alpha 6$.

Figure 11:
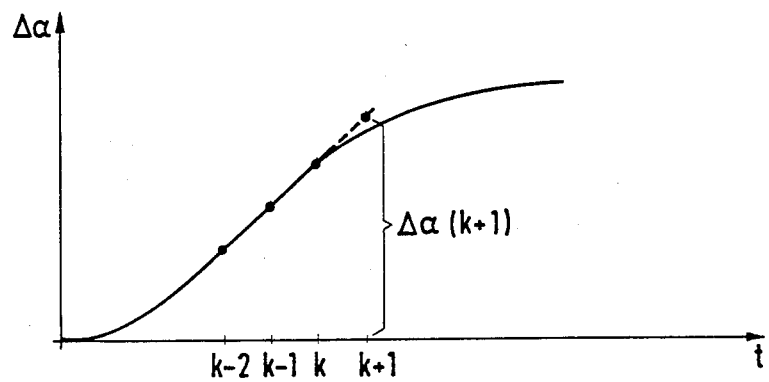
FIG. 11 shows the method of extrapolation of the velocity reference values.

FIG. 11 shows the extrapolation procedure, the curve in time of the velocity reference values being plotted in one axis. It is assumed here that the reference value happens to be present at the time k. Then using the reference values at the times k-1 and k-2, the expected value at the time k+1 is extrapolated in advance in accordance with a Taylor development. This value extrapolated in advance is then compared with the corresponding limit, and the procedure mentioned in connection with the figures described above is initiated.

Figure 12:
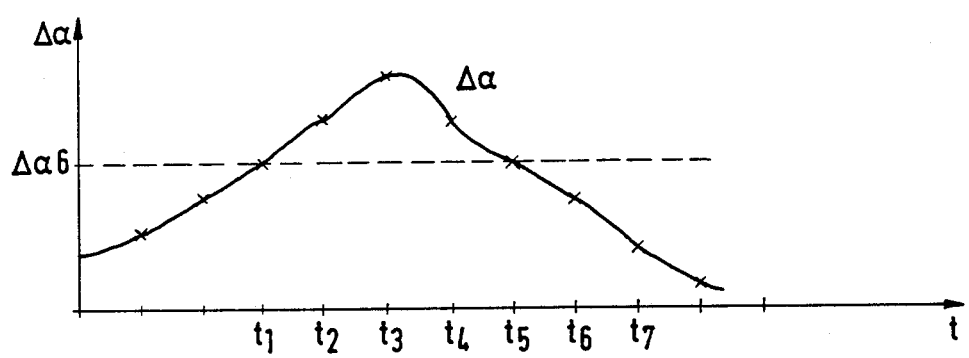
FIGS. 12 and 13 are graphs of the control behavior during the velocity control.
Figure 13:
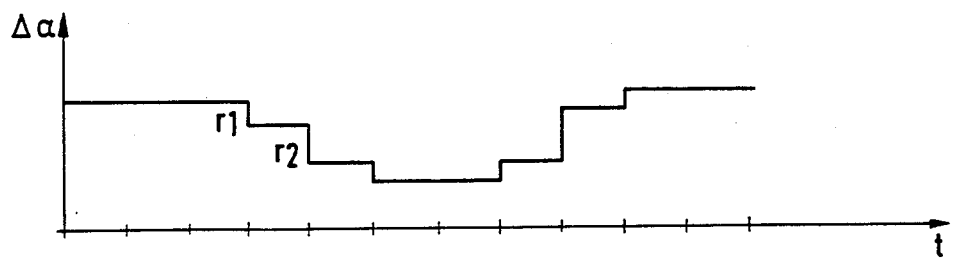

FIGS. 12 and 13 show a control behavior of the integrating controller according to FIG. 4. As may be seen, the extrapolation carried out at the time $t_1$ yields a value to be expected at the time $t_2$, which exceeds the predetermined limit $\Delta a_G$. Therefore, the track velocity is lowered at the time $t_1$ from 100% by a factor r1 according to the control deviation of the controller, as shown in FIG. 13. The computation at the time $t_2$ shows that at the time $t_2$ an even greater excess of the limit can be expected. Consequently, an even larger reduction r2 of the track velocity V is then also made at the time $t_2$. This procedure is contained. At the time $t_5$ the advance calculation shows that the next value would lie below the limit $\Delta a_G$. Accordingly, the velocity V is increased again at the time $t_5$, etc. until at the time $t_7$, the original velocity is reached again. The velocity reduction possible here can go down to 1% of the maximally possible velocity.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A computer controller for an industrial multiaxis robot, in which the motion of the robot tip along a track given in fixed coordinates is transformed into corresponding velocity reference values for drives in the individual axes, comprising:

means having said velocity reference values as inputs for reducing the track velocity of the predetermined overall motion of the robot until none of the velocity reference values exceeds a limit associated with that reference value if at least one velocity reference value of one axis exceeds its associated limit; and further means having at least one of said velocity reference values as an input and coupled to said means for reducing the track velocity for reducing the velocity of the overall motion in predetermined position ranges of at least one of the individual axes;

limits of said predetermined position ranges and the reduction of the velocity being dependent on at least one of the respective track velocity and track acceleration.

2. The computer controller recited in claim 1, wherein the velocity of the overall motion is controlled as a function of the difference between said reference values and said associated limits.

3. The computer controller recited in claim 2, wherein each drive in an individual axis is controlled according to a predetermined control characteristic dependent on the track velocity.

4. The computer controller recited in claim 1, wherein said means having said velocity reference values as inputs for reducing the track velocity of the predetermined overall motion of the robot until none of the velocity reference values exceeds a limit associated with that reference value if at least one velocity reference value of one axis exceeds its associated limit comprises means for each velocity reference value for extrapolating the velocity reference values expected in the respective axis from the present velocity reference values.

* * * * *